(12) United States Patent
Larsson

(10) Patent No.: US 9,937,489 B2
(45) Date of Patent: Apr. 10, 2018

(54) EXHAUST SYSTEM WITHOUT A DOC HAVING AN ASC ACTING AS A DOC IN A SYSTEM WITH AN SCR CATALYST BEFORE THE ASC

(71) Applicant: Johnson Matthey Public Limited Company, London (GB)

(72) Inventor: Mikael Larsson, Gothenburg (SE)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 15/184,206

(22) Filed: Jun. 16, 2016

(65) Prior Publication Data

US 2016/0367974 A1 Dec. 22, 2016

Related U.S. Application Data

(60) Provisional application No. 62/181,278, filed on Jun. 18, 2015.

(51) Int. Cl.
*B01J 21/04* (2006.01)
*B01J 23/40* (2006.01)
(Continued)

(52) U.S. Cl.
CPC ........ *B01J 29/763* (2013.01); *B01D 53/9418* (2013.01); *B01D 53/9436* (2013.01); *B01D 53/9472* (2013.01); *B01J 21/04* (2013.01); *B01J 23/44* (2013.01); *B01J 23/6482* (2013.01); *B01J 29/743* (2013.01); *B01J 29/783* (2013.01); *B01J 35/0006* (2013.01); *B01J 35/04* (2013.01); *B01J 37/0244* (2013.01); *B01J 37/0246* (2013.01); *F01N 3/106* (2013.01); *F01N 3/2066* (2013.01); *F01N 3/2828* (2013.01);
(Continued)

(58) Field of Classification Search
CPC ... B01J 23/40; B01J 23/42; B01J 23/44; B01J 23/72; B01J 23/745; B01J 29/763; B01J 35/04; B01J 21/04; B01D 53/9418; B01D 53/9436; B01D 53/944; B01D 53/9472; F01N 3/106; F01N 3/2066; F01N 3/2828
See application file for complete search history.

(56) References Cited

U.S. PATENT DOCUMENTS

| 4,010,238 A | 3/1977 | Shiraishi et al. |
| 4,085,193 A | 4/1978 | Nakajima et al. |

(Continued)

FOREIGN PATENT DOCUMENTS

EP     2878360 A1    6/2015

*Primary Examiner* — Cam N. Nguyen

(57) ABSTRACT

Catalyst articles having a first zone containing a first SCR catalyst and a second zone containing an ammonia slip catalyst (ASC), where the ammonia slip catalyst contains a second SCR catalyst and an oxidation catalyst, and the ASC has DOC functionality, where the first zone is located on the inlet side of the substrate and the second zone is located in the outlet side of the substrate are disclosed. The catalytic articles are useful for selective catalytic reduction (SCR) of NOx in exhaust gases, in reducing the amount of ammonia slip and in oxidizing organic residues. Exhaust systems containing the catalyst articles and methods of using the catalytic articles in an SCR process, where the amount of ammonia slip is reduced and hydrocarbon are oxidized by the ASC catalyst, are also described.

13 Claims, 9 Drawing Sheets

(51) Int. Cl.
    *B01J 23/42*     (2006.01)
    *B01J 23/44*     (2006.01)
    *B01J 23/72*     (2006.01)
    *B01J 23/745*    (2006.01)
    *B01J 29/76*     (2006.01)
    *B01J 35/04*     (2006.01)
    *B01D 53/94*     (2006.01)
    *F01N 3/10*      (2006.01)
    *F01N 3/20*      (2006.01)
    *F01N 3/28*      (2006.01)
    *B01J 35/00*     (2006.01)
    *B01J 23/648*    (2006.01)
    *F01N 13/00*     (2010.01)
    *B01J 37/02*     (2006.01)
    *B01J 29/74*     (2006.01)
    *B01J 29/78*     (2006.01)

(52) U.S. Cl.
    CPC ........ *F01N 13/0093* (2014.06); *B01D 53/944* (2013.01); *B01D 2255/1021* (2013.01); *B01D 2255/1023* (2013.01); *B01D 2255/20723* (2013.01); *B01D 2255/20738* (2013.01); *B01D 2255/20761* (2013.01); *B01D 2255/50* (2013.01); *B01D 2255/9022* (2013.01); *B01D 2255/9032* (2013.01); *B01D 2255/9037* (2013.01); *B01D 2255/915* (2013.01); *B01J 2229/18* (2013.01); *B01J 2229/186* (2013.01); *B01J 2229/36* (2013.01); *F01N 2330/06* (2013.01); *F01N 2370/04* (2013.01); *F01N 2510/0684* (2013.01); *F01N 2570/14* (2013.01); *F01N 2570/18* (2013.01)

(56) References Cited

U.S. PATENT DOCUMENTS

| | | | | |
|---|---|---|---|---|
| 7,481,983 B2 * | 1/2009 | Patchett | ............ | B01D 53/9418 422/177 |
| 8,246,922 B2 * | 8/2012 | Boorse | ............... | B01D 53/9445 422/170 |
| 8,252,258 B2 * | 8/2012 | Muller-Stach | ....... | B01D 53/944 423/213.2 |
| 8,293,182 B2 * | 10/2012 | Boorse | ............... | B01D 53/9468 422/180 |
| 8,449,852 B1 * | 5/2013 | Sung | ........................ | B01J 23/62 423/213.5 |
| 8,568,674 B1 * | 10/2013 | Sung | .................... | B01J 37/0244 423/213.2 |
| 8,637,426 B2 * | 1/2014 | Hoke | ................... | B01D 53/945 502/333 |
| 8,679,434 B1 * | 3/2014 | Li | ............................ | B01J 23/42 423/213.5 |
| 8,789,356 B2 * | 7/2014 | Phillips | .............. | B01D 53/9418 60/274 |
| 8,858,904 B2 * | 10/2014 | Punke | .................. | B01J 37/0248 422/177 |
| 9,242,212 B2 * | 1/2016 | Phillips | ............ | B01D 53/9418 |
| 9,333,490 B2 * | 5/2016 | Kazi | ........................ | B01J 23/44 |
| 9,440,192 B2 * | 9/2016 | Hoke | .................... | B01D 53/945 |
| 9,527,031 B2 * | 12/2016 | Chandler | ............... | B01D 53/94 |
| 9,527,034 B2 * | 12/2016 | Bergeal | ................ | B01D 53/945 |
| 9,545,602 B2 * | 1/2017 | Sonntag | ................ | B01J 35/0006 |
| 9,579,603 B2 * | 2/2017 | Sonntag | ................ | B01J 35/0006 |
| 9,597,636 B2 * | 3/2017 | Sonntag | ................ | B01J 35/0006 |
| 9,649,596 B2 * | 5/2017 | Chang | ................ | B01D 53/9418 |
| 9,757,718 B2 * | 9/2017 | Fedeyko | ................ | B01J 29/763 |
| 9,759,441 B2 * | 9/2017 | Tadokoro | ................ | F24F 7/007 |
| 2007/0110643 A1 | 5/2007 | Sobolevshiy et al. | | |
| 2009/0288402 A1 * | 11/2009 | Voss | .................... | B01D 53/9418 60/299 |
| 2010/0111796 A1 | 5/2010 | Caudle et al. | | |
| 2010/0175372 A1 | 7/2010 | Lambert et al. | | |
| 2011/0286900 A1 * | 11/2011 | Caudle | ............... | B01D 53/9436 423/213.5 |
| 2014/0154163 A1 * | 6/2014 | Andersen | ............ | B01J 37/0244 423/237 |
| 2014/0212350 A1 * | 7/2014 | Andersen | ............ | B01J 23/6527 423/237 |
| 2014/0219879 A1 * | 8/2014 | Bull | ................ | B01D 53/9418 422/170 |
| 2015/0031526 A1 | 1/2015 | Micallef et al. | | |
| 2015/0151288 A1 * | 6/2015 | Rivas-Cardona | .... | B01J 37/0225 423/700 |
| 2015/0157982 A1 * | 6/2015 | Rajaram | ............ | B01D 53/9486 423/213.5 |
| 2015/0360178 A1 * | 12/2015 | Kalwei | ................ | B01D 53/944 423/212 |
| 2016/0008759 A1 * | 1/2016 | Sonntag | .................... | B01J 35/04 423/239.1 |
| 2016/0038878 A1 * | 2/2016 | Sonntag | ................ | B01J 35/0006 423/213.5 |
| 2016/0045868 A1 * | 2/2016 | Sonntag | ................ | B01J 35/0006 423/213.2 |
| 2016/0367973 A1 * | 12/2016 | Larsson | ................ | B01J 29/763 |

* cited by examiner

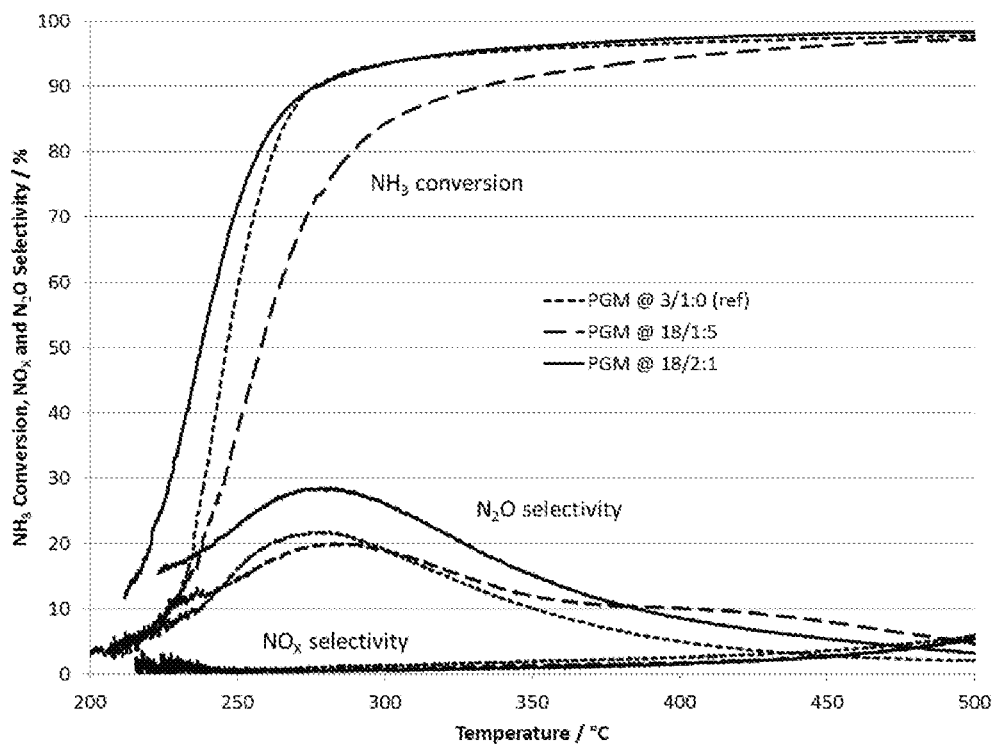
Fig. 4 - Fresh
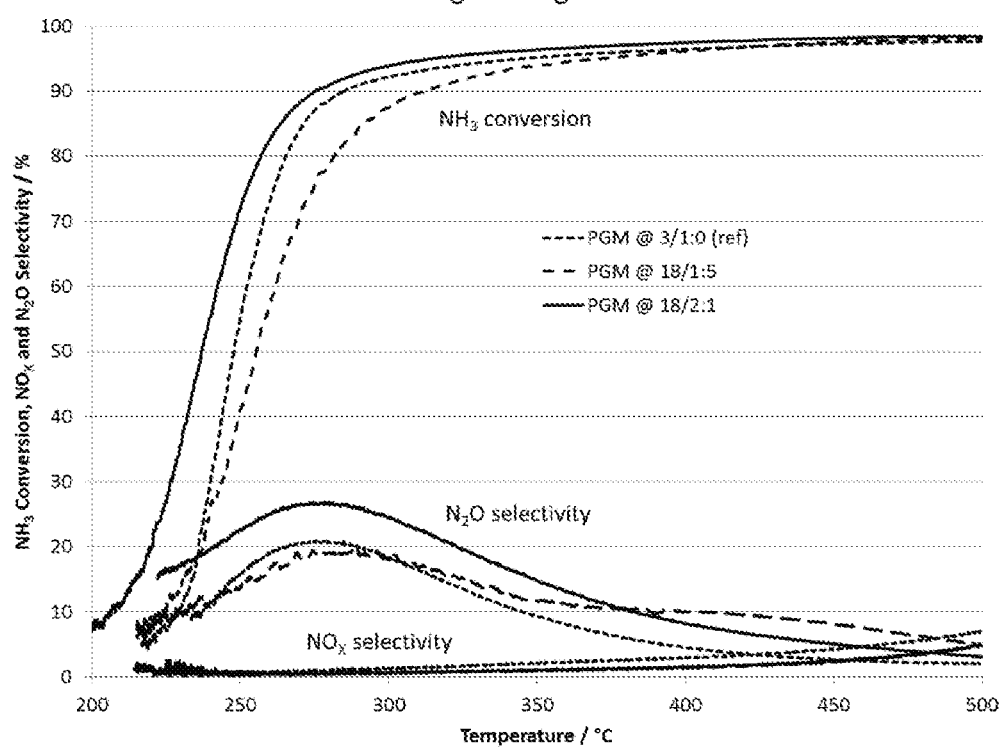
Fig. 5 - Aged

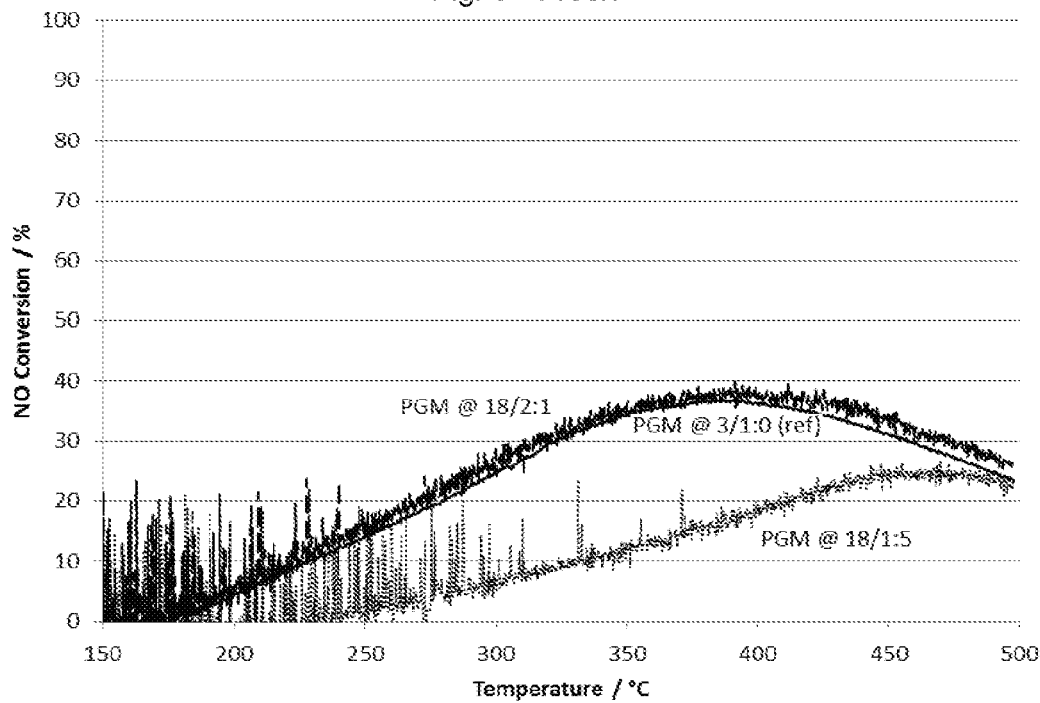
Fig. 6 - Fresh
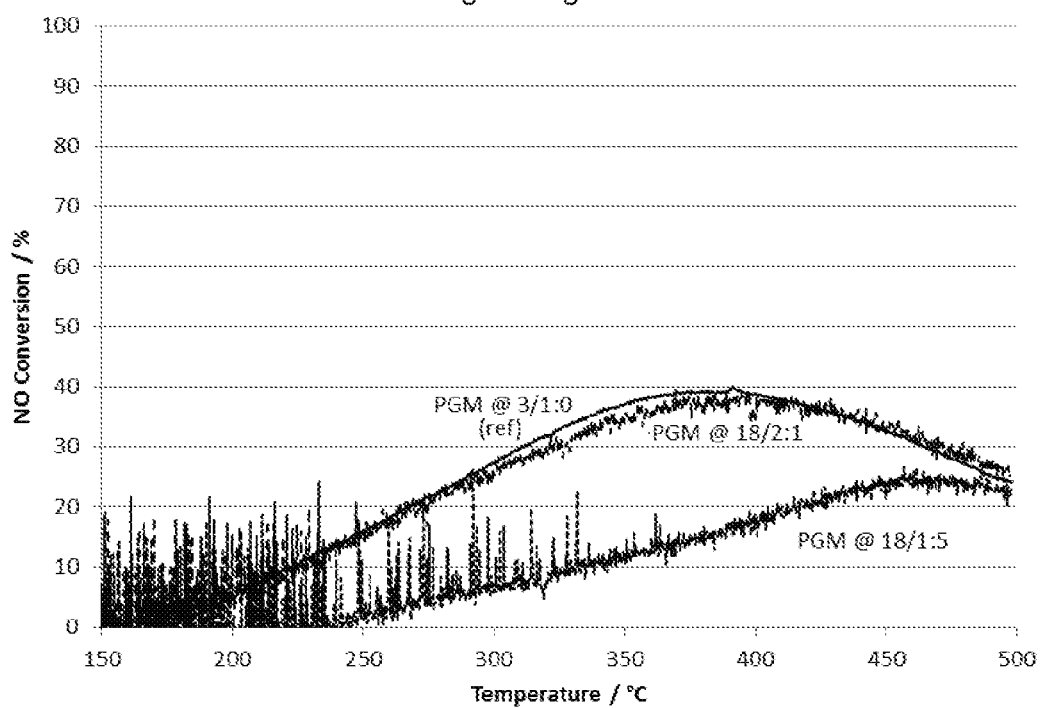
Fig. 7 - Aged

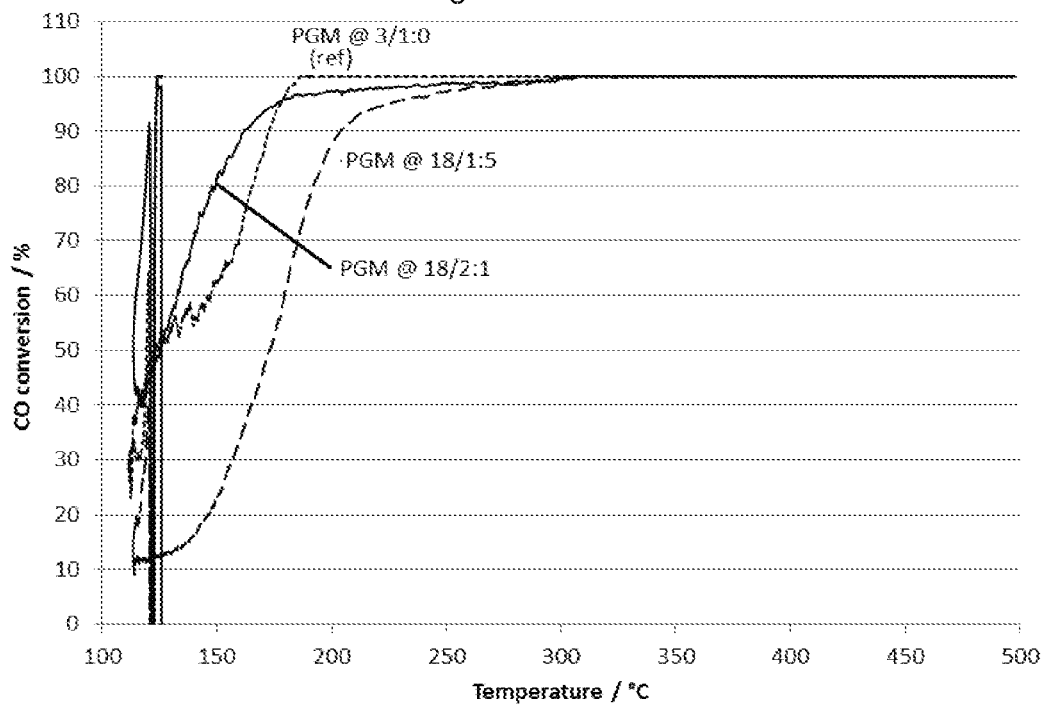
Fig. 8. - Fresh
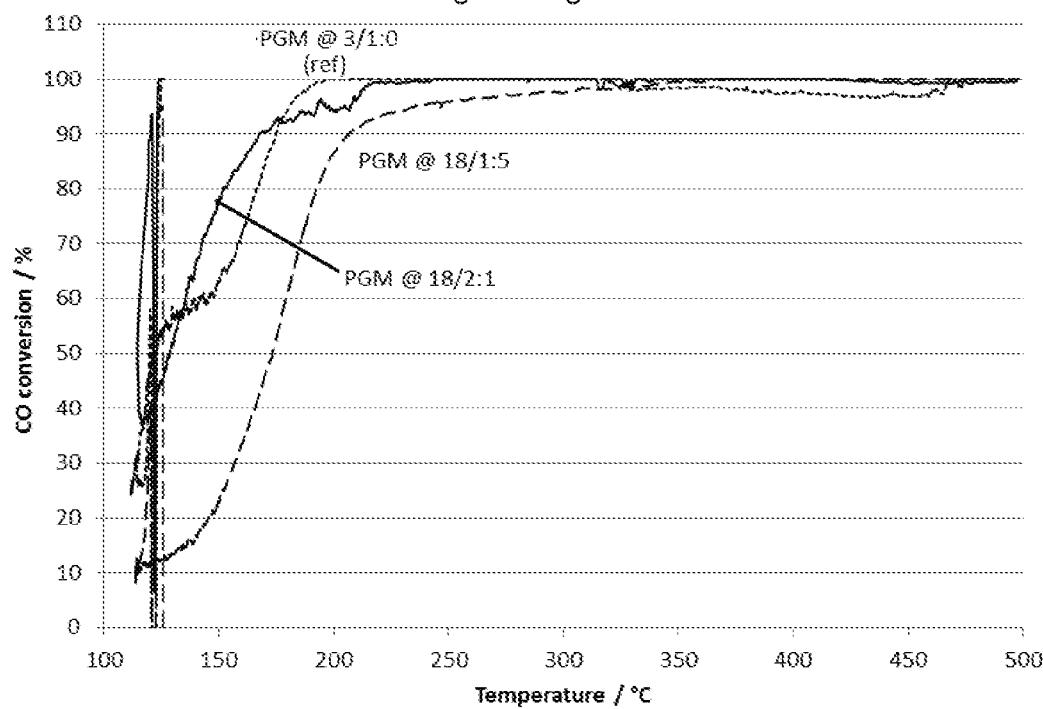
Fig. 9. - Aged

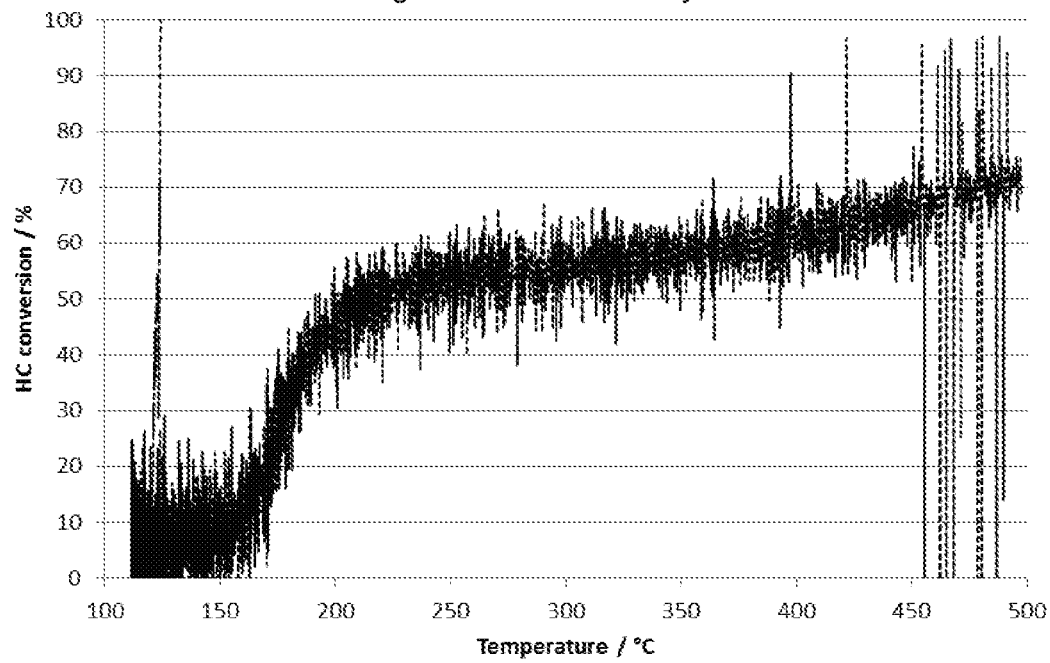
Fig. 10. - Fresh Pt only
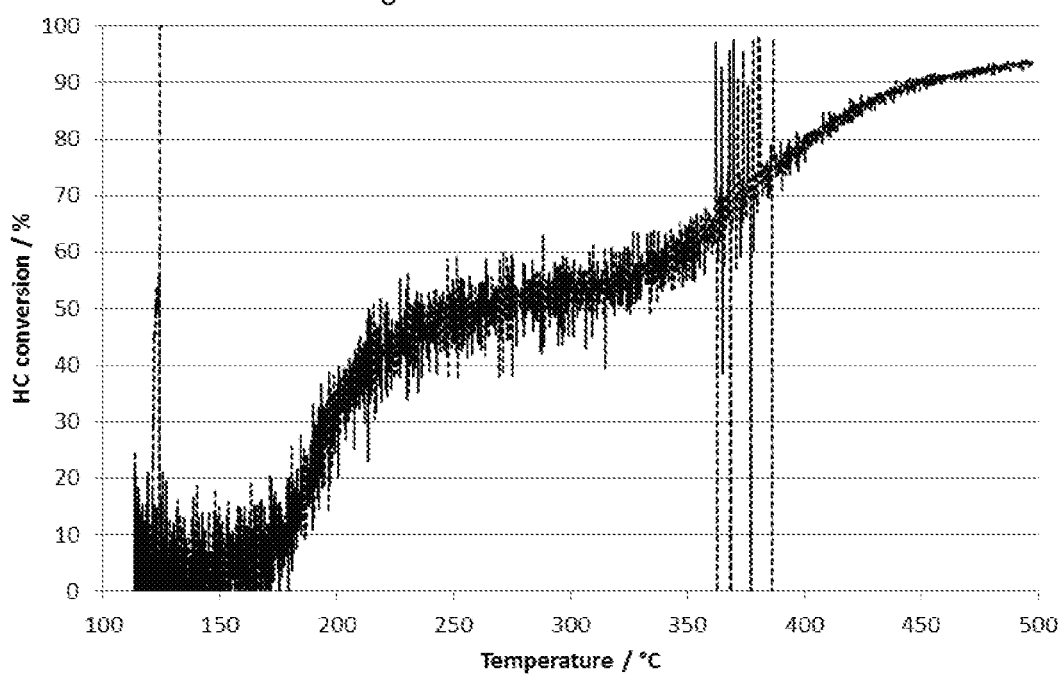
Fig. 11. - Fresh 1:5 Pt:Pd

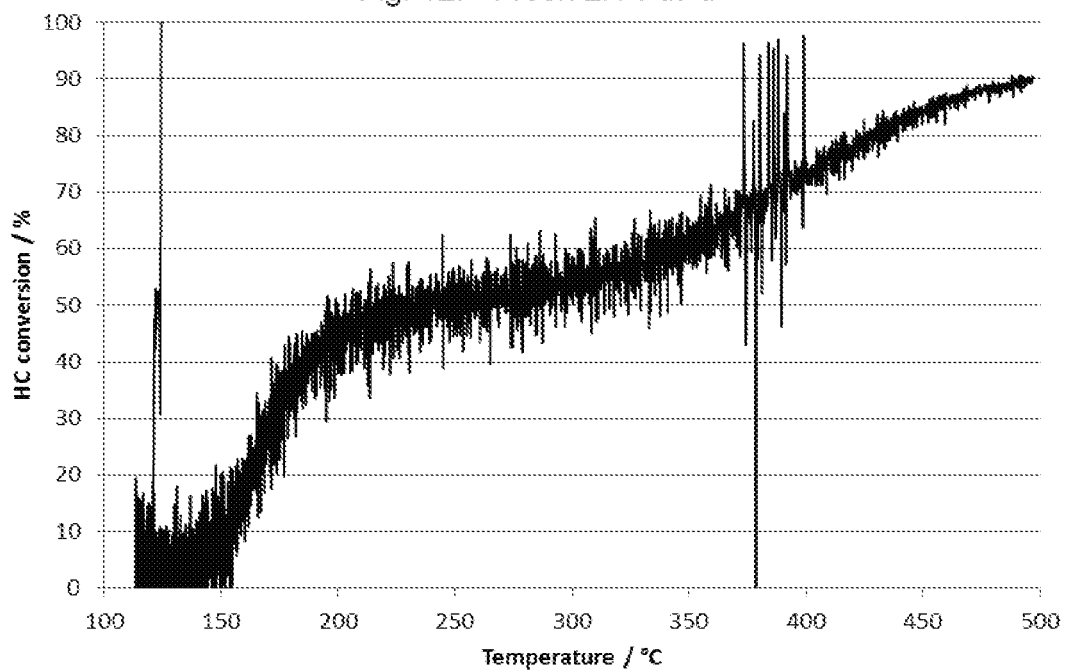
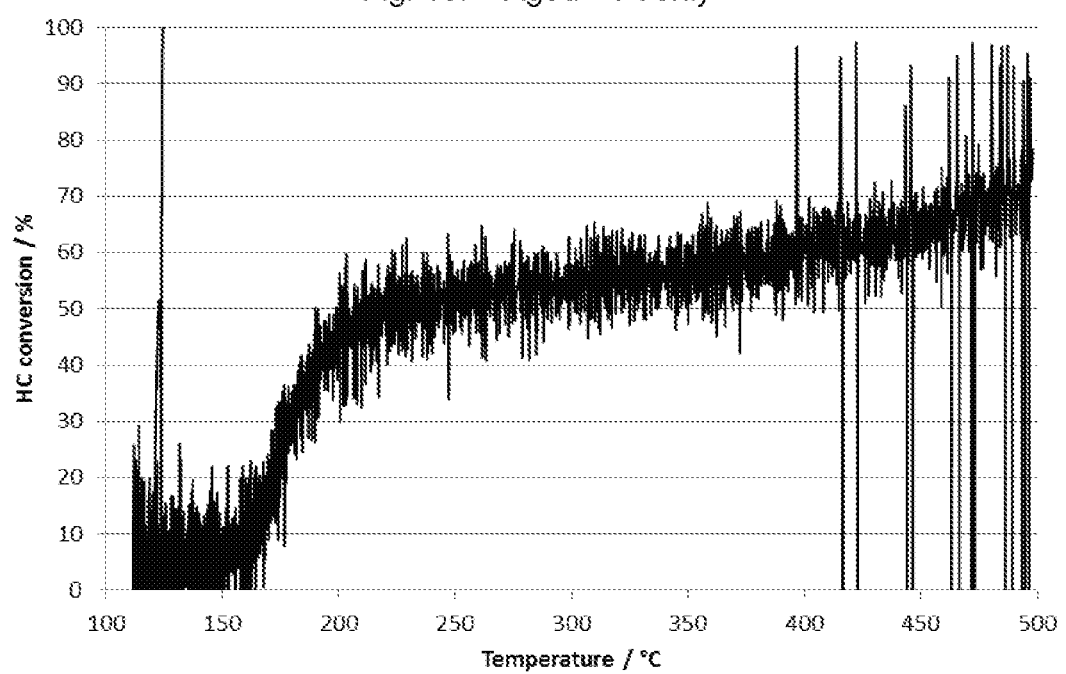

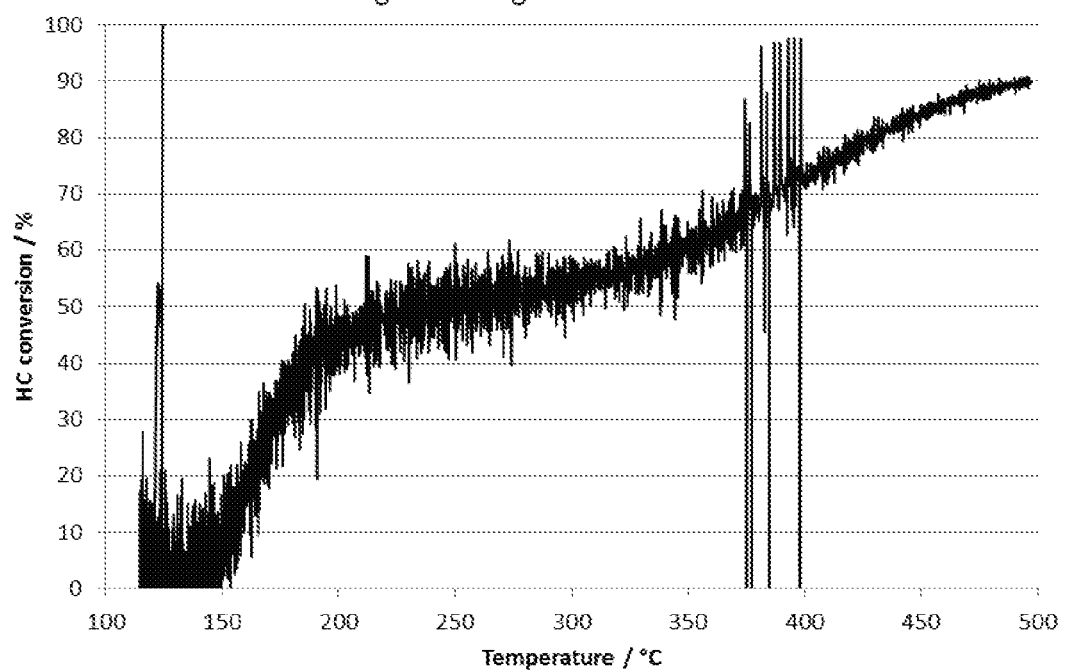
Fig. 14. – Aged – 2:1 Pt:Pd
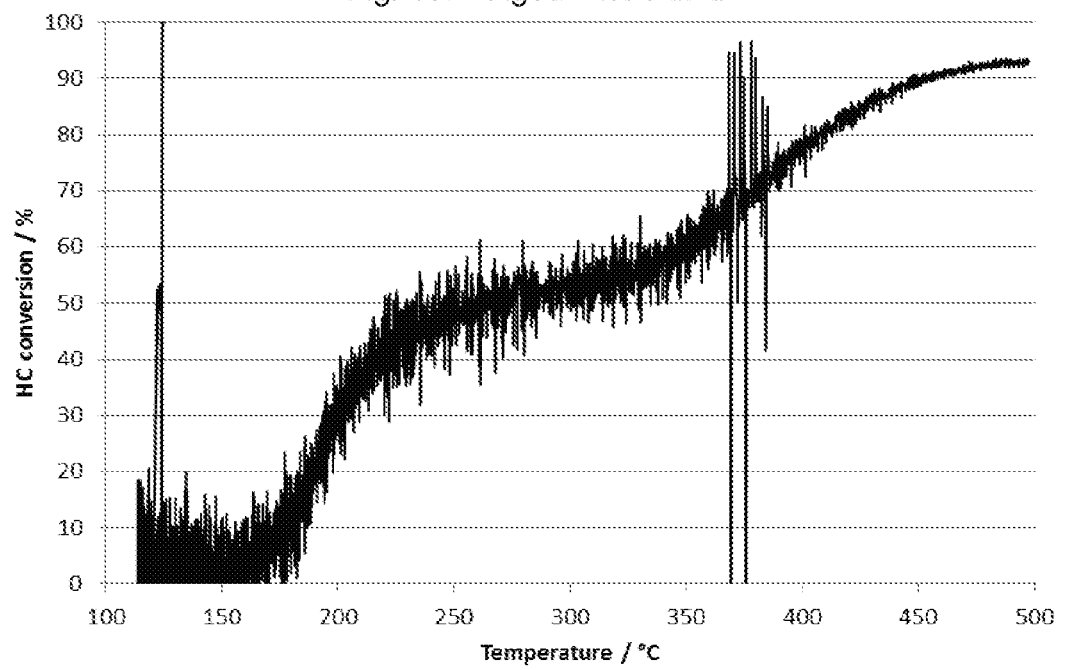
Fig. 15. – Aged – 1:5 Pt:Pd

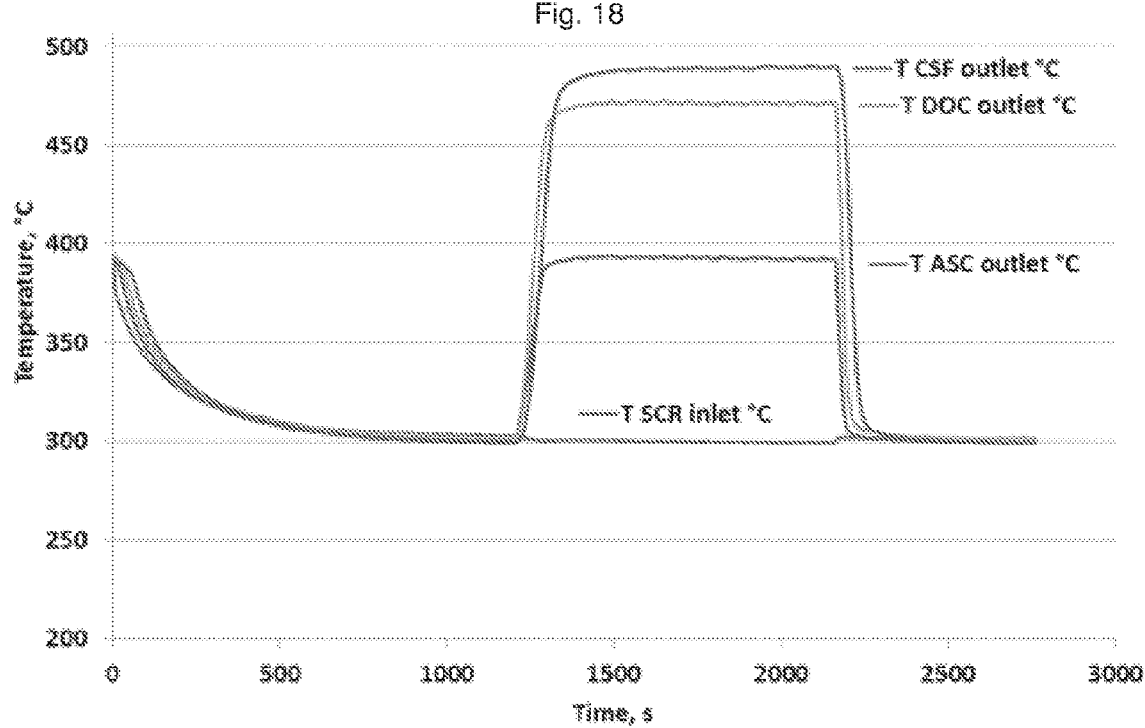

EXHAUST SYSTEM WITHOUT A DOC HAVING AN ASC ACTING AS A DOC IN A SYSTEM WITH AN SCR CATALYST BEFORE THE ASC

FIELD OF THE INVENTION

The invention relates to ammonia slip catalysts (ASC), articles containing ammonia slip catalysts and methods of manufacturing and using such articles to reduce ammonia slip.

BACKGROUND OF THE INVENTION

Hydrocarbon combustion in diesel engines, stationary gas turbines, and other systems generates exhaust gas that must be treated to remove nitrogen oxides (NOx), which comprises NO (nitric oxide) and $NO_2$ (nitrogen dioxide), with NO being the majority of the NOx formed. NOx is known to cause a number of health issues in people as well as causing a number of detrimental environmental effects including the formation of smog and acid rain. To mitigate both the human and environmental impact from $NO_x$ in exhaust gas, it is desirable to eliminate these undesirable components, preferably by a process that does not generate other noxious or toxic substances.

Exhaust gas generated in lean-burn and diesel engines is generally oxidative. NOx needs to be reduced selectively with a catalyst and a reductant in a process known as selective catalytic reduction (SCR) that converts NOx into elemental nitrogen ($N_2$) and water. In an SCR process, a gaseous reductant, typically anhydrous ammonia, aqueous ammonia, or urea, is added to an exhaust gas stream prior to the exhaust gas contacting the catalyst. The reductant is absorbed onto the catalyst and the $NO_x$ is reduced as the gases pass through or over the catalyzed substrate. In order to maximize the conversion of NOx, it is often necessary to add more than a stoichiometric amount of ammonia to the gas stream. However, release of the excess ammonia into the atmosphere would be detrimental to the health of people and to the environment. In addition, ammonia is caustic, especially in its aqueous form. Condensation of ammonia and water in regions of the exhaust line downstream of the exhaust catalysts can result in a corrosive mixture that can damage the exhaust system. Therefore the release of ammonia in exhaust gas should be eliminated. In many conventional exhaust systems, an ammonia oxidation catalyst (also known as an ammonia slip catalyst or "ASC") is installed downstream of the SCR catalyst to remove ammonia from the exhaust gas by converting it to nitrogen. The use of ammonia slip catalysts can allow for $NO_x$ conversions of greater than 90% over a typical diesel driving cycle.

It would be desirable to have a catalyst that provides for both NOx removal by SCR and for selective ammonia conversion to nitrogen, where ammonia conversion occurs over a wide range of temperatures in a vehicle's driving cycle, and minimal nitrogen oxide and nitrous oxide byproducts are formed.

SUMMARY OF THE INVENTION

In a first aspect, the invention relates to a catalyst article comprising a substrate comprising an inlet end and an outlet, a first zone comprising a first SCR catalyst and a second zone comprising an ammonia slip catalyst (ASC), where the ammonia slip catalyst comprises a second SCR catalyst and an oxidation catalyst, and the ASC has DOC functionality, where the first zone is located on the inlet side of the substrate and the second zone is located in the outlet side of the substrate.

In another aspect, the invention relates to exhaust systems comprising a catalytic article of the first aspect of the invention and a means for forming $NH_3$ in the exhaust gas.

In yet another aspect, the invention relates to an engine comprising an exhaust system comprising a catalyst article of the first aspect of the invention and a means for forming $NH_3$ in the exhaust gas.

In still another aspect, the invention relates to methods of controlling hydrocarbon emissions in an exhaust gas, where the method comprises contacting an exhaust gas comprising hydrocarbons with a catalyst article of the first aspect of the invention.

In another aspect, the invention relates to methods of forming an exotherm in a catalyst treating hydrocarbon emissions in an exhaust gas, where the method comprises contacting an exhaust gas comprising hydrocarbons with a catalyst article of the first aspect of the invention.

In still another aspect, the invention relates to methods of forming an exotherm in a catalyst treating hydrocarbon emissions in an exhaust gas, the method comprising contacting an exhaust gas comprising hydrocarbons with a catalyst article of the first aspect of the invention.

In yet another aspect, the invention relates to a method of controlling NOx emissions in an exhaust gas, where the method comprises contacting an exhaust gas comprising NOx or $NH_3$ with a catalyst article of the first aspect of the invention.

In a further aspect, the invention relates to a method of controlling $N_2O$ emissions in an exhaust gas, where the method comprises contacting an exhaust gas comprising NOx or $NH_3$ with a catalyst article of the first aspect of the invention.

BRIEF DESCRIPTION OF THE DRAWINGS

FIG. 4 is a graph showing $NH_3$ conversion, $N_2O$ selectivity and $NO_X$ selectivity using fresh catalysts.

FIG. 5 is a graph showing $NH_3$ conversion, $N_2O$ selectivity and $NO_X$ selectivity using aged catalysts.

FIG. 6 is a graph showing NO conversion using fresh catalysts.

FIG. 7 is a graph showing NO conversion using aged catalysts.

FIG. 8 is a graph showing CO conversion using fresh catalysts.

FIG. 9 is a graph showing CO conversion using aged catalysts.

FIG. 10 is a graph showing hydrocarbon (HC) conversion using a fresh reference catalyst.

FIG. 11 is a graph showing hydrocarbon (HC) conversion using a fresh catalyst having a 1:5 Pt:Pd ratio.

FIG. 12 is a graph showing hydrocarbon (HC) conversion using a fresh catalyst having a 2:1 Pt:Pd ratio.

FIG. 13 is a graph showing hydrocarbon (HC) conversion using an aged reference catalyst.

FIG. 14 is a graph showing hydrocarbon (HC) conversion using an aged catalyst having a 1:5 Pt:Pd ratio.

FIG. 15 is a graph showing hydrocarbon (HC) conversion using an aged catalyst having a 2:1 Pt:Pd ratio.

FIG. 18 is a graph showing the temperature at various points in an exhaust system containing a reference catalyst with Pt and Pd in a 2:1 loading.

DETAILED DESCRIPTION OF THE INVENTION

Figure 1:
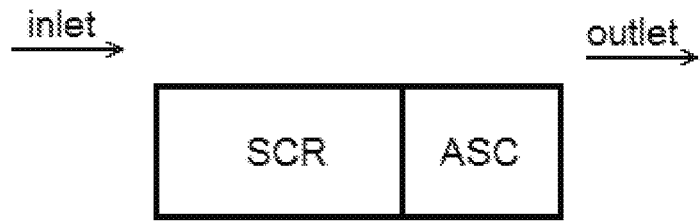
FIG. 1 depicts a configuration in which the SCR is positioned in the exhaust gas flow before an ASC.

As used in this specification and the appended claims, the singular forms "a", "an" and "the" include plural referents unless the context clearly indicates otherwise. Thus, for example, reference to "a catalyst" includes a mixture of two or more catalysts, and the like.

The term "ammonia slip", means the amount of unreacted ammonia that passes through the SCR catalyst.

The term "support" means the material to which a catalyst is fixed.

The term "a support with low ammonia storage" means a support that stores less than 0.001 mmol $NH_3$ per $m^3$ of support. The support with low ammonia storage is preferably a molecular sieve or zeolite having a framework type selected from the group consisting of AEI, ANA, ATS, BEA, CDO, CFI, CHA, CON, DDR, ERI, FAU, FER, GON, IFR, IFW, IFY, IHW, IMF, IRN, IRY, ISV, ITE, ITG, ITN, ITR, ITW, IWR, IWS, IWV, IWW, JOZ, LTA, LTF, MEL, MEP, MFI, MRE, MSE, MTF, MTN, MTT, MTW, MVY, MWW, NON, NSI, RRO, RSN, RTE, RTH, RUT, RWR, SEW, SFE, SFF, SFG, SFH, SFN, SFS, SFV, SGT, SOD, SSF, SSO, SSY, STF, STO, STT, SVR, SVV, TON, TUN, UOS, UOV, UTL, UWY, VET, VNI. More preferably, the molecular sieve or zeolite has a framework type selected from the group consisting of BEA, CDO, CON, FAU, MEL, MFI and MWW, even more preferably the framework type is selected from the group consisting of BEA and MFI.

The term "calcine", or "calcination", means heating the material in air or oxygen. This definition is consistent with the IUPAC definition of calcination. (IUPAC. Compendium of Chemical Terminology, 2nd ed. (the "Gold Book"). Compiled by A. D. McNaught and A. Wilkinson. Blackwell Scientific Publications, Oxford (1997). XML on-line corrected version: http://goldbook.iupac.org (2006-) created by M. Nic, J. Jirat, B. Kosata; updates compiled by A. Jenkins. ISBN 0-9678550-9-8. doi: 10.1351/goldbook.) Calcination is performed to decompose a metal salt and promote the exchange of metal ions within the catalyst and also to adhere the catalyst to a substrate. The temperatures used in calcination depend upon the components in the material to be calcined and generally are between about 400° C. to about 900° C. for approximately 1 to 8 hours. In some cases, calcination can be performed up to a temperature of about 1200° C. In applications involving the processes described herein, calcinations are generally performed at temperatures from about 400° C. to about 700° C. for approximately 1 to 8 hours, preferably at temperatures from about 400° C. to about 650° C. for approximately 1 to 4 hours.

The term "about" means approximately and refers to a range that is optionally ±25%, preferably ±10%, more preferably, ±5%, or most preferably ±1% of the value with which the term is associated.

When a range, or ranges, for various numerical elements are provided, the range, or ranges, can include the values, unless otherwise specified.

The term "$N_2$ selectivity" means the percent conversion of ammonia into nitrogen.

The term "diesel oxidation catalyst" (DOC) is a well-known term in the art used to describe a type of catalysts used to treat exhaust gases containing hydrocarbons from combustion processes.

The term "platinum group metal" or "PGM" refers to platinum, palladium, ruthenium, rhodium, osmium and iridium. The platinum group metal is are preferably platinum, palladium, ruthenium or rhodium.

The term "active component loading" refers to the weight of the support of platinum+the weight of platinum+the weight of the first SCR catalyst in the blend. Platinum can be present in the catalyst in an active component loading from about 0.01 to about 0.25 wt. %, inclusive. Preferably, platinum can be present in the catalyst in an active component loading from 0.04-0.2 wt. %, inclusive. More preferably, platinum can be present in the catalyst in an active component loading from 0.07-0.17 wt. %, inclusive. Most preferably, platinum can be present in the catalyst in an active component loading from 0.05-0.15 wt. %, inclusive.

The terms "downstream" and "upstream" describe the orientation of a catalyst or substrate where the flow of exhaust gas is from the inlet end to the outlet end of the substrate or article.

In the first aspect of the invention, a catalyst article comprises a substrate comprising an inlet end and an outlet, a first zone comprising a first SCR catalyst and a second zone comprising an ammonia slip catalyst (ASC), where the ammonia slip catalyst comprises a second SCR catalyst and an oxidation catalyst, and the ASC has DOC functionality, where the first zone is located on the inlet side of the substrate and the second zone is located in the outlet side of the substrate. The catalyst article can generate an exotherm. The first zone and the second zone can be located on the same substrate where the first zone is located on the inlet side of the substrate and the second zone is located on the outlet side of the substrate.

The catalyst article can further comprise a second substrate, where the first zone is located on a first substrate and the second zone is located on the second substrate and the first substrate is located upstream of the second substrate. The catalyst article can comprise a first piece and a second piece, where the first zone is located in the first piece and the second zone is located in the second piece and the first piece is located upstream of the second piece.

The first zone comprises a first SCR catalyst. The second zone comprises an ASC catalyst comprising an oxidation catalyst and a second SCR catalyst. The ASC can be a bi-layer with a bottom layer comprising an oxidation catalyst and a top, overlayer, comprising a second SCR catalyst. The ASC catalyst can be a single layer comprising a blend of an oxidation catalyst and a second SCR catalyst.

SCR Catalysts

The compositions comprise two SCR catalysts: a first SCR catalyst in the SCR zone and a second SCR catalyst as part of the ammonia slip catalyst (ASC). The first SCR catalyst can be different from the second SCR catalyst by comprising a different active component, as described below, by having a different loading of the active component, or both.

The active component in the first and second SCR catalysts can be independently selected from the group consisting of a base metal, an oxide of a base metal, a molecular sieve, a metal exchanged molecular sieve or a mixture thereof. The base metal can be selected from the group consisting of vanadium (V), molybdenum (Mo), tungsten (W), chromium (Cr), cerium (Ce), manganese (Mn), iron (Fe), cobalt (Co), nickel (Ni), copper (Cu), and zirconium (Zr) and mixtures thereof. SCR compositions consisting of vanadium supported on a refractory metal oxide such as alumina, silica, zirconia, titania, ceria and combinations thereof are well known and widely used commercially in mobile applications. Typical compositions are described in U.S. Pat. Nos. 4,010,238 and 4,085,193, the entire contents of which are incorporated herein by reference. Compositions used commercially, especially in mobile applications, comprise $TiO_2$ on to which $WO_3$ and $V_2O_5$ have been dispersed at concentrations ranging from 5 to 20 wt. % and 0.5 to 6 wt. %, respectively. The SCR catalyst can comprise Nb—Ce—Zr or Nb on $MnO_2$. These catalysts may contain other inorganic materials such as $SiO_2$ and $ZrO_2$ acting as binders and promoters.

When the SCR catalyst is a base metal, the catalyst article can further comprise at least one base metal promoter. As used herein, a "promoter" is understood to mean a substance that when added into a catalyst, increases the activity of the catalyst. The base metal promoter can be in the form of a metal, an oxide of the metal, or a mixture thereof. The at least one base metal catalyst promoter may be selected from neodymium (Nd), barium (Ba), cerium (Ce), lanthanum (La), praseodymium (Pr), magnesium (Mg), calcium (Ca), manganese (Mn), zinc (Zn), niobium (Nb), zirconium (Zr), molybdenum (Mo), tin (Sn), tantalum (Ta), strontium (Sr) and oxides thereof. The at least one base metal catalyst promoter can preferably be $MnO_2$, $Mn_2O_3$, $Fe_2O_3$, $SnO_2$, CuO, CoO, $CeO_2$ and mixtures thereof. The at least one base metal catalyst promoter may be added to the catalyst in the form of a salt in an aqueous solution, such as a nitrate or an acetate. The at least one base metal catalyst promoter and at least one base metal catalyst, e.g., copper, may be impregnated from an aqueous solution onto the oxide support material(s), may be added into a washcoat comprising the oxide support material(s), or may be impregnated into a support previously coated with the washcoat.

The SCR catalyst can comprise a molecular sieve or a metal exchanged molecular sieve. As is used herein "molecular sieve" is understood to mean a metastable material containing tiny pores of a precise and uniform size that may be used as an adsorbent for gases or liquids. The molecules which are small enough to pass through the pores are adsorbed while the larger molecules are not. The molecular sieve can be a zeolitic molecular sieve, a non-zeolitic molecular sieve, or a mixture thereof.

A zeolitic molecular sieve is a microporous aluminosilicate having any one of the framework structures listed in the Database of Zeolite Structures published by the International Zeolite Association (IZA). The framework structures include, but are not limited to those of the CHA, FAU, BEA, MFI, MOR types. Non-limiting examples of zeolites having these structures include chabazite, faujasite, zeolite Y, ultra-stable zeolite Y, beta zeolite, mordenite, silicalite, zeolite X, and ZSM-5. Aluminosilicate zeolites can have a silica/alumina molar ratio (SAR) defined as $SiO_2/Al_2O_3$) from at least about 5, preferably at least about 20, with useful ranges of from about 10 to 200.

Either of the SCR catalysts can comprise a small pore, a medium pore or a large pore molecular sieve, or combinations thereof. A "small pore molecular sieve" is a molecular sieve containing a maximum ring size of 8 tetrahedral atoms. A "medium pore molecular sieve" is a molecular sieve containing a maximum ring size of 10 tetrahedral atoms. A "large pore molecular sieve" is a molecular sieve having a maximum ring size of 12 tetrahedral atoms. The SCR catalysts can comprise a small pore molecular sieve selected from the group consisting of aluminosilicate molecular sieves, metal-substituted aluminosilicate molecular sieves, aluminophosphate (AlPO) molecular sieves, metal-substituted aluminophosphate (MeAlPO) molecular sieves, silico-aluminophosphate (SAPO) molecular sieves, and metal substituted silico-aluminophosphate (MeAPSO) molecular sieves, and mixtures thereof.

Either of the SCR catalysts can comprise a small pore molecular sieve selected from the group of Framework Types consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SFW, SIV, THO, TSC, UEI, UFI, VNI, YUG, and ZON, and mixtures and/or intergrowths thereof. Preferably the small pore molecular sieve is selected from the group of Framework Types consisting of CHA, LEV, AEI, AFX, ERI, SFW, KFI, DDR and ITE.

Either of the SCR catalysts can comprise a medium pore molecular sieve selected from the group of Framework Types consisting of AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, -SVR, SZR, TER, TON, TUN, UOS, VSV, WEI, and WEN, and mixtures and/or intergrowths thereof. Preferably, the medium pore molecular sieve selected from the group of Framework Types consisting of MFI, FER and STT.

Either of the SCR catalysts can comprise a large pore molecular sieve selected from the group of Framework Types consisting of AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, and VET, and mixtures and/or intergrowths thereof. Preferably, the large pore molecular sieve is selected from the group of Framework Types consisting of MOR, OFF and BEA.

A metal exchanged molecular sieve can have at least one metal from one of the groups VB, VIB, VIIB, VIIIB, IB, or IIB of the periodic table deposited onto extra-framework sites on the external surface or within the channels, cavities, or cages of the molecular sieves. Metals may be in one of several forms, including, but not limited to, zero valent metal atoms or clusters, isolated cations, mononuclear or polynuclear oxycations, or as extended metal oxides. Preferably, the metals can be iron, copper, and mixtures or combinations thereof.

The metal can be combined with the zeolite using a mixture or a solution of the metal precursor in a suitable solvent. The term "metal precursor" means any compound or complex that can be dispersed on the zeolite to give a catalytically-active metal component. Preferably the solvent is water due to both economics and environmental aspects of using other solvents. When copper, a preferred metal is used, suitable complexes or compounds include, but are not limited to, anhydrous and hydrated copper sulfate, copper nitrate, copper acetate, copper acetylacetonate, copper oxide, copper hydroxide, and salts of copper ammines (e.g. $[Cu(NH_3)_4]^{2+}$). This invention is not restricted to metal precursors of a particular type, composition, or purity. The molecular sieve can be added to the solution of the metal component to form a suspension, which is then allowed to react so that the metal component is distributed on the zeolite. The metal can be distributed in the pore channels as well as on the outer surface of the molecular sieve. The metal can be distributed in ionic form or as a metal oxide. For example, copper may be distributed as copper (II) ions, copper (I) ions, or as copper oxide. The molecular sieve containing the metal can be separated from the liquid phase of the suspension, washed, and dried. The resulting metal-containing molecular sieve can then be calcined to fix the metal in the molecular sieve. Preferably, the SCR catalysts comprise a Cu-SCR, Fe-SCR, vanadium, a mixed oxide, promoted Ce—Zr or promoted $MnO_2$.

A metal exchanged molecular sieve can contain in the range of about 0.10% and about 10% by weight of a group VB, VIB, VIIB, VIIIB, IB, or IIB metal located on extra framework sites on the external surface or within the channels, cavities, or cages of the molecular sieve. Preferably, the extra framework metal can be present in an amount of in the range of about 0.2% and about 5% by weight.

The metal exchanged molecular sieve can be a copper (Cu) or iron (Fe) supported molecular sieve having from about 0.1 wt. % to about 20 wt. % copper or iron of the total weight of the catalyst. More preferably copper or iron is present from about 0.5 wt. % to about 15 wt. % of the total weight of the catalyst. Most preferably copper or iron is present from about 1 wt. % to about 9 wt. % of the total weight of the catalyst.

The second SCR catalyst can be a Cu-SCR catalyst, an Fe-SCR catalyst, a base metal, an oxide of a base metal or a mixed oxide or a vanadium catalyst. The Cu-SCR catalyst comprises copper and a small pore molecular sieve and the Fe-SCR catalyst comprises iron and a small pore molecular sieve. The small pore molecular sieve can be an aluminosilicate, an aluminophosphate (AlPO), a silico-aluminophosphate (SAPO), or mixtures thereof. The small pore molecular sieve can be selected from the group of Framework Types consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, and ZON, and mixtures and/or intergrowths thereof. Preferably, the small pore molecular sieve can be selected from the group of Framework Types consisting of AEI, AFX, CHA, DDR, ERI, ITE, KFI, LEV and SFW. The ratio of the amount of the first SCR catalyst to the amount of platinum on the support with low ammonia storage can be in the range of at least one of: (a) 0:1 to 300:1, (b) 3:1 to 300:1, (c) 7:1 to 100:1; and (d) 10:1 to 50:1, inclusive, based on the weight of these components. Platinum can be present from at least one of: (a) 0.01-0.3 wt. %, (b) 0.03-0.2 wt. %, (c) 0.05-0.17 wt. %, and (d) 0.07-0.15 wt. %, inclusive, relative to the weight of the support of platinum+the weight of platinum+the weight of the first SCR catalyst in the blend.

Ammonia Slip Catalyst

The ammonia slip catalyst can be a bi-layer with a lower layer comprising an oxidation catalyst and an upper, over-layer, comprising a second SCR catalyst. The ammonia slip catalyst can be a single layer comprising a blend of an oxidation catalyst and a second SCR catalyst.

The oxidation catalyst is preferably a platinum group metal, preferably platinum or palladium or a mixture thereof. Platinum can be present in an amount from about 0.1 g/ft³ to about 20 g/ft³ in the ASC zone. Palladium can be present in an amount from about 0.1 g/ft³ to about 20 g/ft³ in the ASC zone. When platinum and palladium are both present in the ASC zone, Pt and Pd are present in a ratio of from about 1:0.01 to about 1:10 by weight.

A bi-layer ammonia slip catalyst preferably comprises a bottom layer comprising platinum and a top layer comprising copper zeolite, preferably a copper chabazite, where palladium is also present in the bottom layer, or the top layer or both the top and bottom layers. The top layer can further comprise palladium. When palladium is present in the top layer, it is preferably present in a blend with the copper zeolite where the palladium is on a support when mixed with the copper zeolite to make the blend. These compositions can help improve the exothermic performance of the catalyst.

When the second zone comprises a blend of an oxidation catalyst and the second SCR catalyst, the oxidation catalyst can comprise platinum on a support with low ammonia storage. The support with low ammonia storage can be a siliceous support. The siliceous support can comprise a silica or a zeolite with a silica-to-alumina ratio of at least one of: (a) at least 100, (b) at least 200, (c) at least 250, (d) at least 300, (e) at least 400, (f) at least 500, (g) at least 750 and (h) at least 1000. The siliceous support can comprise a molecular sieve having a BEA, CDO, CON, FAU, MEL, MFI or MWW Framework Type. The ratio of the amount of the SCR catalyst to the amount of platinum on the support with low ammonia storage can be in the range of 0:1 to 300:1, preferably 3:1 to 300:1, more preferably 7:1 to 100:1 and most preferably 10:1 to 50:1, including each of the endpoints in the ratio, based on the weight of these components. The blend can further comprise Pd, Nb—Ce—Zr or Nb on $MnO_2$.

The catalysts described herein can be used in the SCR treatment of exhaust gases from various engines. One of the properties of a catalyst comprising a blend of platinum on a siliceous support with a first SCR catalyst, where the first SCR catalyst is a Cu-SCR or Fe-SCR catalyst, is that it can provide an improvement in $N_2$ yield from ammonia at a temperature from about 250° C. to about 350° C. compared to a catalyst comprising a comparable formulation in which the first SCR catalyst is present as a first layer and platinum is supported on a layer that stores ammonia is present in a second coating and gas comprising $NH_3$ passes through the first layer before passing through the second coating. Another property of a catalyst comprising a blend of platinum on a support with low ammonia storage with a first SCR catalyst, where the first SCR catalyst is a Cu-SCR catalyst or an Fe-SCR catalyst, is that it can provide reduced $N_2O$ formation from $NH_3$ compared to a catalyst comprising a comparable formulation in which the first SCR catalyst is present as a first layer and platinum supported on a support that stores ammonia is present in a second coating and gas comprising $NH_3$ passes through the first layer before passing through the second coating.

In one aspect of the invention, various configurations of catalysts comprising a blend of platinum on a support with low ammonia storage with a first SCR catalyst can be prepared. The portion of the catalyst comprising a blend of platinum on a support does not store ammonia with a first SCR catalyst is labeled as "blend" in the figures described below.

In a first configuration, a catalyst article comprises a substrate having an inlet and an outlet, a first zone comprising an SCR catalyst and a second zone comprising an ammonia slip catalyst (ASC), where the first zone is located on the inlet side of the substrate and the second zone is located downstream of the first zone and on the outlet side of the substrate. FIG. 1 depicts a configuration in which the SCR is positioned at the inlet of the article within the exhaust gas flow and the ASC is positioned at the outlet of the article.

Figure 2:
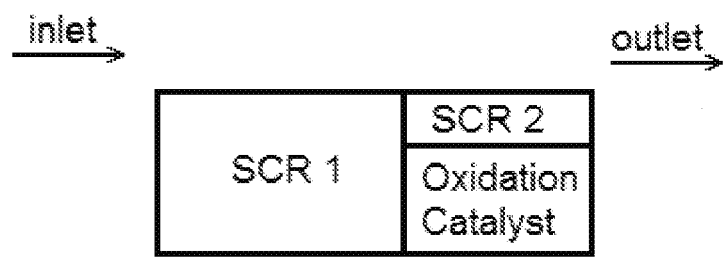
FIG. 2 depicts a configuration in which the SRC is positioned in the exhaust gas flow before a bi-layer catalyst comprising a top layer with a second SCR catalyst over a bottom layer comprising an oxidation catalyst.

In a second configuration, a catalyst article comprises a substrate having an inlet and an outlet, a first zone comprising a first SCR catalyst, a second zone comprising an ammonia slip catalyst (ASC), where the ASC comprises a bi-layer with a top layer comprising a second SCR catalyst and a bottom layer comprising an oxidation catalyst, where the first zone is located on the inlet side of the substrate, the second zone is located downstream of the first zone and is located on the outlet side of the substrate. This configuration is similar to the first configuration with the ASC being a bi-layer with a top layer comprising a second SCR catalyst and a bottom layer comprising an oxidation catalyst. FIG. 2 depicts a configuration in which the first zone is positioned at the inlet of the article within the exhaust gas flow, the second zone comprising an ASC comprising a bi-layer with a top layer comprising a second SCR catalyst and a bottom layer comprising an oxidation catalyst is positioned downstream of the first zone and is positioned at the outlet of the article. The top layer can comprise palladium in addition to the second SCR catalyst.

Figure 3:
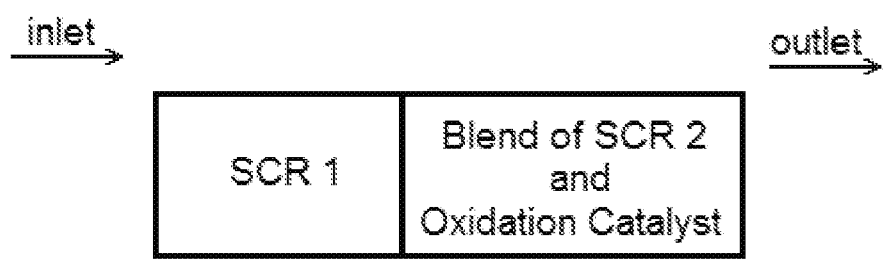
FIG. 3 depicts a configuration in which the SRC is positioned in the exhaust gas flow before an ASC comprising a blend of a second SCR catalyst and an oxidation catalyst.

In a third configuration, a catalyst article comprises a substrate having an inlet and an outlet, a first zone comprising a first SCR catalyst and a second zone comprising an ammonia slip catalyst (ASC), where the ammonia slip catalyst comprises a blend of second SCR catalyst and an oxidation catalyst, and the first zone is located on the inlet side of the substrate and the second zone is located downstream of the first zone and is located on the outlet side of the substrate. This configuration is similar to the first configuration with the ASC being a blend of a second SCR catalyst and an oxidation catalyst. FIG. 3 depicts a configuration in which the SCR zone comprising a first SCR catalyst is positioned at the inlet of the article within the exhaust gas flow, and the ACS zone is comprised of a blend of a second SCR catalyst and an oxidation catalysts, and the ACS zone is positioned downstream of the SCR zone at the outlet of the article.

In each of the above configurations, each of the zones can be located on the same substrate or there can be two or more substrates with one or more zones on each substrate. In an exhaust system, when two or more substrates are used, one or more substrates can be located in a single housing or casing or in different housings or casings.

When the second zone in the catalytic article comprises a blend of the oxidation catalyst and the second SCR catalyst, the catalytic article can have one or more properties related to $N_2$ yield, reduction in NOx formation, and reduction in $N_2O$ formation. The catalyst article can provide an improvement in $N_2$ yield from ammonia at a temperature from about 250° C. to about 350° C. compared to a catalyst comprising a comparable formulation in which the first SCR catalyst is present as a first coating and the platinum on a support with low ammonia storage is present in a second coating and gas comprising $NH_3$ passes through the first coating before passing through the second coating. The catalyst article can provide at least one of: (a) an improvement in $N_2$ yield from ammonia at a temperature from about 350° C. to about 450° C., and (b) a reduction in NOx formation at a temperature from about 350° C. to about 450° C., compared to a catalyst comprising a comparable formulation in which the first SCR catalyst is present as a first coating and the supported platinum is present in a second coating and gas comprising $NH_3$ passes through the first coating before passing through the second coating. The catalyst article can provide reduced $N_2O$ formation from $NH_3$ compared to a catalyst comprising a comparable formulation in which the first SCR catalyst is present as a first coating and the supported platinum is present in a second coating and gas comprising $NH_3$ passes through the first coating before passing through the second coating.

The substrate for the catalyst may be any material typically used for preparing automotive catalysts that comprises a flow-through or filter structure, such as a honeycomb structure, an extruded support, a metallic substrate, or a SCRF. Preferably the substrate has a plurality of fine, parallel gas flow passages extending from an inlet to an outlet face of the substrate, such that passages are open to fluid flow. Such monolithic carriers may contain up to about 700 or more flow passages (or "cells") per square inch of cross section, although far fewer may be used. For example, the carrier may have from about 7 to 600, more usually from about 100 to 400, cells per square inch ("cpsi"). The passages, which are essentially straight paths from their fluid inlet to their fluid outlet, are defined by walls onto which the SCR catalyst is coated as a "washcoat" so that the gases flowing through the passages contact the catalytic material. The flow passages of the monolithic substrate are thin-walled channels which can be of any suitable cross-sectional shape such as trapezoidal, rectangular, square, triangular, sinusoidal, hexagonal, oval, circular, etc. The invention is not limited to a particular substrate type, material, or geometry.

Ceramic substrates may be made of any suitable refractory material, such as cordierite, cordierite-α alumina, α-alumina, silicon carbide, silicon nitride, zirconia, mullite, spodumene, alumina-silica magnesia, zirconium silicate, sillimanite, magnesium silicates, zircon, petalite, alumino-silicates and mixtures thereof.

Wall flow substrates may also be formed of ceramic fiber composite materials, such as those formed from cordierite and silicon carbide. Such materials are able to withstand the environment, particularly high temperatures, encountered in treating the exhaust streams.

The substrates can be a high porosity substrate. The term "high porosity substrate" refers to a substrate having a porosity of between about 40% and about 80%. The high porosity substrate can have a porosity preferably of at least about 45%, more preferably of at least about 50%. The high porosity substrate can have a porosity preferably of less than about 75%, more preferably of less than about 70%. The term porosity, as used herein, refers to the total porosity, preferably as measured with mercury porosimetry.

Preferably, the substrate can be cordierite, a high porosity cordierite, a metallic substrate, an extruded SCR, a filter or an SCRF.

A washcoat comprising a blend of platinum on a support with low ammonia storage low, preferably a siliceous support, and a first SCR catalyst, where the first SCR catalyst is preferably a Cu-SCR catalyst or an Fe-SCR catalyst, can be applied to the inlet side of the substrate using a method known in the art. After application of the washcoat, the composition can be dried and calcined. When the composition comprises a second SCR, the second SCR can be applied in a separate washcoat to a calcined article having the bottom layer, as described above. After the second washcoat is applied, it can be dried and calcined as performed for the first coating.

The substrate with the platinum containing layer can be dried and calcined at a temperature within the range of 300° C. to 1200° C., preferably 400° C. to 700° C., and more preferably 450° C. to 650° C. The calcination is preferably done under dry conditions, but it can also be performed hydrothermally, i.e., in the presence of some moisture content. Calcination can be performed for a time of between about 30 minutes and about 4 hours, preferably between about 30 minutes and about 2 hours, more preferably between about 30 minutes and about 1 hour.

An exhaust system can comprise a catalyst article of the first aspect of the invention and a first means for forming $NH_3$ in the exhaust gas or introducing $NH_3$ into the exhaust gas, where the first means for forming $NH_3$ in the exhaust gas or introducing $NH_3$ into the exhaust gas is located before the catalytic article. In an exhaust system, when two or more substrates are used, one or more substrates can be located in a single housing or casing or in different housings or casings. The exhaust system can further comprise a catalysed soot filter (CSF) or an SCRF (SCR on a filter), where the CSF or SCRF are positioned downstream of the catalytic article. When the system comprises an SCRF, a second means for forming $NH_3$ in the exhaust gas or introducing $NH_3$ into the exhaust gas is located between the catalytic article and the SCRF. The catalysed soot filter can comprise a high PGM loading in the front of the filter. A high PGM loading means a loading of at least 5 g/ft$^3$ in heavy duty diesel engines and at from about 10 g/ft$^3$ to about 205 g/ft$^3$ in light duty diesel engines in about the front 5-50 mm of the filter.

An engine can comprise an exhaust system comprising a catalyst article of the first aspect of the invention and a means for forming $NH_3$ in the exhaust gas or introducing $NH_3$ into the exhaust gas. The engine can be a diesel engine on a vehicle, a diesel engine on a stationary source, or a diesel engine on a vessel, such as a ship.

In another aspect of the invention, a method of controlling hydrocarbon emissions in an exhaust gas comprises contacting an exhaust gas comprising hydrocarbons with a catalyst article of the first aspect of the invention.

In yet another aspect of the invention, a method of forming an exotherm in a catalyst treating hydrocarbon emissions in an exhaust gas comprises contacting an exhaust gas comprising hydrocarbons with a catalyst article of the first aspect of the invention.

In still another aspect of the invention, a method of controlling NOx emissions in an exhaust gas comprises contacting an exhaust gas comprising NOx or $NH_3$ with a catalyst article of the first aspect of the invention.

In further aspect of the invention, a method of controlling $N_2O$ emissions in an exhaust gas comprises contacting an exhaust gas comprising NOx or $NH_3$ with a catalyst article of the first aspect of the invention. Preferably, the catalyst article of the first aspect of the invention is not part of an exhaust system comprising a DOC.

The following examples merely illustrate the invention; the skilled person will recognize many variations that are within the spirit of the invention and scope of the claims.

EXAMPLES

Example 1

Catalyst articles were prepared on a cordierite substrate (400 cpsi) by first placing a washcoat comprising a PGM on alumina on the substrate to form a bottom layer, then drying the washcoat. A top layer was placed on the bottom layer by applying a washcoat comprising copper chabazite (Cu-CHA) (120 g/ft$^3$ Cu), then drying the top layer. After the top layer had dried, the article was calcined.

A reference catalyst article was prepared containing only platinum as the PGM at a loading of 3 g/ft$^3$. A sample comprising Pt and Pd as the PGM was prepared with a total PGM loading of 18 g/ft$^3$, with a Pt:Pd at ratio of 1:5. A sample comprising Pt and Pd as the PGM was prepared with a total PGM loading of 18 g/ft$^3$, with a Pt:Pd at ratio of 2:1.

The samples were tested fresh and after hydrothermal ageing at 580° C. for 100 hours.

1"×1" core of the samples first had $N_2$ gas passed over them as the temperature increased from room temperature to 150° C. Then gas containing $NH_3$=500 ppm, $CO_2$=4.5%, $H_2O$=5%, CO=200 ppm, $O_2$=12%, with the balance being $N_2$, was over the samples at SV=150000 h$^{-1}$, while the temperature increased from 150° C. to 500° C. at a rate of 10° C./minute. The concentrations of $NH_3$, NO$_X$, $N_2O$, CO and $CO_2$ were measured by FTIR at the outlet from the system.

FIGS. 4 and 5 show $NH_3$ conversion, $N_2O$ selectivity and NOx selectivity from the three samples at temperatures from 200° C. to 500° C. in fresh and aged samples. The catalyst with Pt and Pd in a 2:1 ratio provided better low temperature $NH_3$ conversion than the reference with only Pt, while the catalyst with Pt and Pd in a 1:5 ratio provided less $NH_3$ conversion below about 350° C. The catalyst with Pt and Pd in a 2:1 ratio provided higher $N_2O$ selectivity than either the reference with only Pt or the catalyst with Pt and Pd in a 1:5 ratio. The three catalysts provided similar NOx selectivity. These results apply to both fresh and aged samples.

FIGS. 6 and 7 show NO conversions from the three samples at temperatures from 150° C. to 500° C. in fresh and aged samples. Again, fresh and aged samples provided similar results, with the 2:1 mixture of Pt:Pd providing conversion equal to or greater than the reference with only Pt as the PGM.

FIGS. 8 and 9 show CO conversions from the three samples at temperatures from 150° C. to 500° C. in fresh and aged samples. Again, fresh and aged samples provided similar results, with the 2:1 mixture of Pt:Pd providing conversion equal to or greater than the reference with only Pt as the PGM, with the 2:1 mixture of Pt:Pd providing conversion equal to or greater than the reference with only Pt as the PGM.

FIGS. 10-12 and 13-15 show HC conversions from the three samples fat temperatures from 150° C. to 500° C. in fresh and aged samples, respectively. Again, fresh and aged samples provided similar results. The reference samples, which only contain Pt as the PGM, had a maximum HC conversion of about 70% at about 450° C. to 500° C. However, both samples containing mixtures of Pt and Pd provided about 70% HC conversion by about 375° C. and 90% or greater HC conversion by 500° C. This demonstrates that a mixture of Pt and Pd in an ASC is able to oxidize much more hydrocarbons than from the use of Pt alone.

Example 2

Samples of catalysts prepared as describe in Example 1 were placed in an exhaust system along with a diesel oxidation catalyst (DOC) and a catalysed soot filter (CSF). The catalysts were placed in the exhaust system in the order SCR:ASC:DOC:CSF. The exhaust system was connected to engine and urea was injected into the exhaust stream before the SCR catalyst. The outlet from a fuel injector was also located in the system before the SCR. The system was conditioned by running the engine for 1 hour at 450° C.; the engine speed was then reduced to allow the engine temperature to stabilize at about 300° C. After the temperature stabilized, fuel was injected into the exhaust system before the SCR catalyst to raise the temperature after the CSF to about 450° C. After maintaining the temperature after the CSF constant for about 15 minutes, the addition of fuel into the exhaust system was stopped and the temperature was allow to return to about 300° C.

Figure 16:
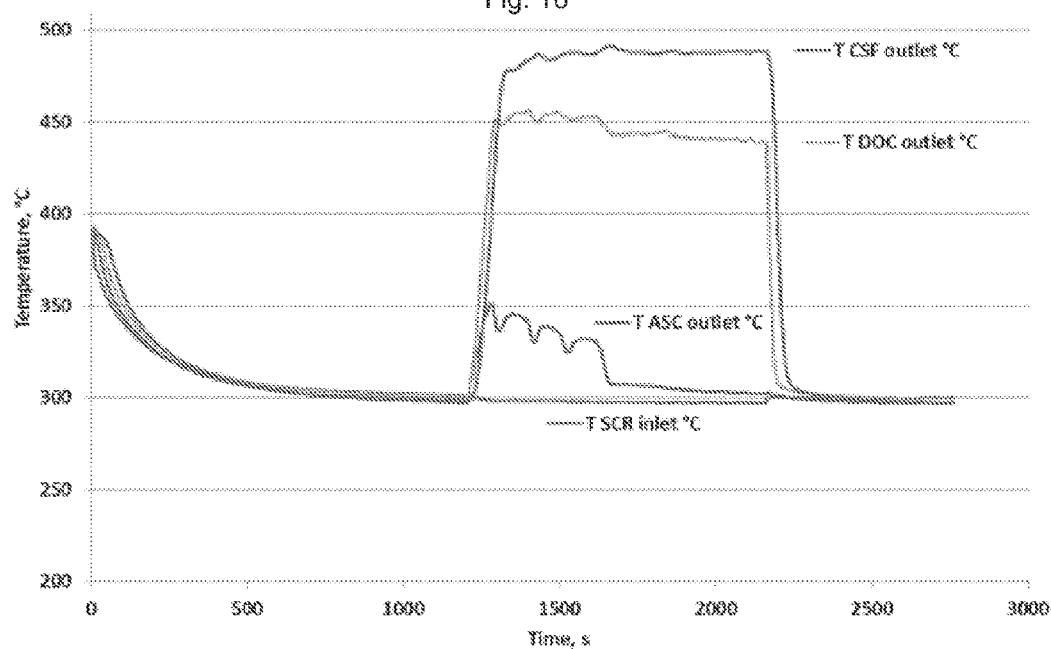
FIG. 16 is a graph showing the temperature at various points in an exhaust system containing a reference catalyst with Pt as the only PGM.
Figure 17:
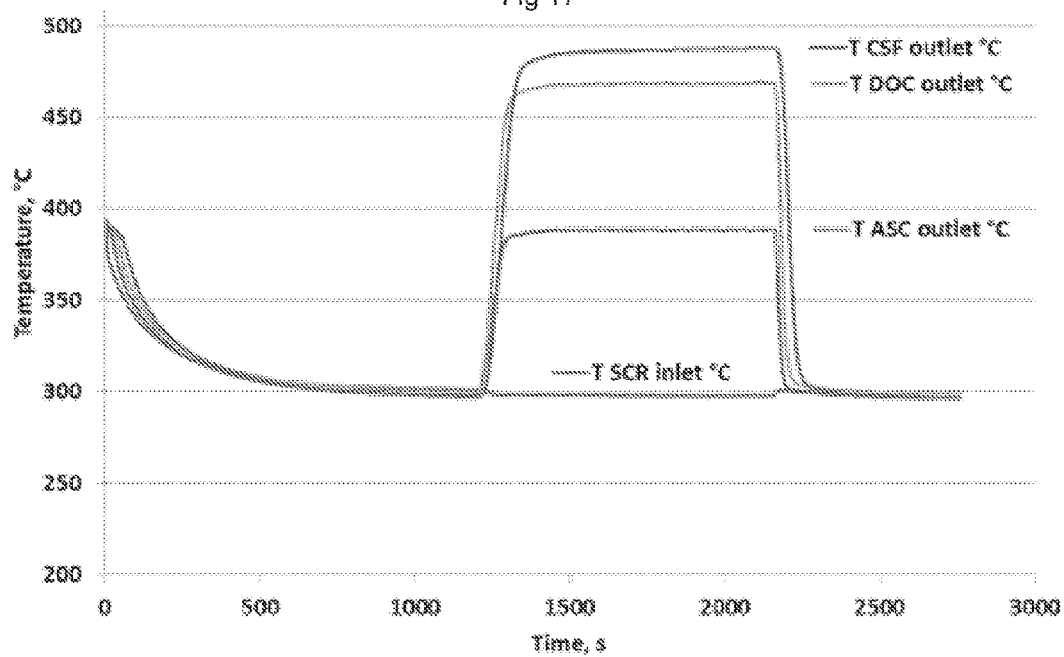
FIG. 17 is a graph showing the temperature at various points in an exhaust system containing a reference catalyst with Pt and Pd in a 1:5 loading.

The temperatures at the inlet to the SCR, and the outlets from the ASC, DOC and CSF were measured. These temperature are shown in FIG. 16-18 for the reference contain Pt only, the catalyst with 18 g/ft$^3$ of PGM with a 1:5 Pt:Pd loading, and the catalyst with 18 g/ft$^3$ of PGM with a 2:1 Pt:Pd loading, respectively. FIG. 16 shows that the use of a catalyst containing only Pt as the PGM resulted in the outlet temperature at the ASC reaching a maximum of about 350° C. at about 1250 sec, then dropping to about 300° C. by about 1600 sec. However, in both systems using a combination of Pt and Pd, the outlet temperature at the ASC reached a maximum of about 390° C. at about 1250 sec and the temperature remained at about 390° C. until about 2200 sec, indicating that both of these catalysts generated an exotherm. This stable exotherm was not observed in the reference catalyst containing only Pt as the PGM. This demonstrates that when using an SCR before an ASC, the SCR did not generate a stable exotherm.

Example 3—Omitting the DOC Catalyst from a System

A catalyst article is prepared by placing a washcoat comprising vanadium in a first zone extending from the inlet end of a flow-through substrate. The loading of vanadium in the washcoat is preferably between 0.5 and 5 wt. %, inclusive. A second zone extending from the outlet end of the flow-through substrate is formed by first placing a washcoat comprising platinum on the flow-through substrate to form a first layer, then placing a washcoat comprising Cu-CHA over the first layer. Preferably copper is present in/on the chabazite in an amount from between 1 and 5 wt. %, inclusive and the Cu-CHA is present in the layer in an amount from about 60 g/ft$^3$ to about 300 g/ft$^3$. Platinum is present in the layer in an amount from about 10 g/ft$^3$ to about 20 g/ft$^3$ in the ASC zone.

The catalyst article is placed first in the exhaust aftertreatment system before a CSF and the system does not contain a DOC.

Example 4—Omitting the DOC Catalyst from a System

A catalyst article is prepared by placing a washcoat comprising vanadium in a first zone extending from the inlet end of a flow-through substrate. A second zone extending from the outlet end of the flow-through substrate is formed by first placing a washcoat comprising platinum on the flow-through substrate to form a first layer, then placing a washcoat comprising Cu-CHA over the first layer. The amounts of vanadium, copper and chabazite that can be used is described in Example 3.

The catalyst article is placed first in the exhaust aftertreatment system before a SCRF and the system does not contain a DOC.

Example 5—Omitting the DOC Catalyst from a System

A catalyst article is prepared by placing a washcoat comprising vanadium in a first zone extending from the inlet end of a flow-through substrate. A second zone extending from the outlet end of the flow-through substrate is prepared by first placing a washcoat comprising platinum and palladium on the flow-through substrate to form a first layer, then placing a washcoat comprising Cu-CHA over the first layer. Platinum and palladium are present in the layer in a combined amount from 10 g/ft$^3$ to 20 g/ft$^3$ in the ASC zone, where Pt and Pd are present in a ratio of from 1:1 to 1:10 by weight. The amounts of vanadium, copper and chabazite that can be used is described in Example 3.

The catalyst article is placed first in the exhaust aftertreatment system before a CSF and the system does not contain a DOC.

Example 6—Omitting the DOC Catalyst from a System

A catalyst article is prepared as described in Example 5 with palladium also being present in the washcoat comprising Cu-CHA, which is placed over the first layer.

Example 7—Omitting the DOC Catalyst from a System

A catalyst article is prepared by placing a washcoat comprising vanadium in a first zone extending from the inlet end of a flow-through substrate. A second zone extending from the outlet end of the flow-through substrate is prepared by first placing a washcoat comprising platinum and palladium on the flow-through substrate to form a first layer, then placing a washcoat comprising Cu-CHA over the first layer. Platinum and palladium are present in the layer in a combined amount from 10 g/ft$^3$ to 20 g/ft$^3$ in the ASC zone, where Pt and Pd are present in a ratio of from 1:1 to 1:10 by weight. The amounts of vanadium, copper and chabazite that can be used is described in Example 3.

The catalyst article is placed first in the exhaust aftertreatment system before a SCRF and the system does not contain a DOC.

Example 8—Omitting the DOC Catalyst from a System

A catalyst article is prepared as described in Example 7 with palladium also being present in the washcoat comprising Cu-CHA, which is placed over the first layer.

Example 9—Omitting the DOC Catalyst from a System

A catalyst article is prepared by placing a washcoat comprising vanadium in a first zone extending from the inlet end of a flow-through substrate. A second zone extending from the outlet end of the flow-through substrate is prepared placing a washcoat comprising a mixture (blend) of platinum and Cu-CHA on the flow-through substrate to form a layer. Platinum is present in the layer in an amount from 10 g/ft³ to 20 g/ft³ in the ASC zone. The amounts of vanadium, copper and chabazite that can be used is described in Example 3.

The catalyst article is placed first in the exhaust after-treatment system before a CSF and the system does not contain a DOC.

Example 10—Omitting the DOC Catalyst from a System

A catalyst article is prepared by placing a washcoat comprising vanadium in a first zone extending from the inlet end of a flow-through substrate. A second zone extending from the outlet end of the flow-through substrate is prepared by placing a washcoat comprising a mixture (blend) of platinum and Cu-CHA on the flow-through substrate to form a layer. Platinum is present in the layer in an amount from 10 g/ft³ to 20 g/ft³ in the ASC zone. The amounts of vanadium, copper and chabazite that can be used is described in Example 3.

The catalyst article is placed first in the exhaust after-treatment system before a SCRF and the system does not contain a DOC.

Example 11—Omitting the DOC Catalyst from a System

A catalyst article is prepared by placing a washcoat comprising vanadium in a first zone extending from the inlet end of a flow-through substrate. A second zone extending from the outlet end of the flow-through substrate is prepared by placing a washcoat comprising a mixture (blend) of platinum, palladium and Cu-CHA on the flow-through substrate to form a layer. Platinum and palladium are present in the layer in a combined amount from about 10 g/ft³ to about 20 g/ft³ in the ASC zone, where Pt and Pd are present in a ratio of from about 1:1 to about 1:10 by weight. The amounts of vanadium, copper and chabazite that can be used is described in Example 3.

The catalyst article is placed first in the exhaust after-treatment system before a CSF and the system does not contain a DOC.

Example 12—Omitting the DOC Catalyst from a System

A catalyst article is prepared by placing a washcoat comprising vanadium in a first zone extending from the inlet end of a flow-through substrate. A second zone extending from the outlet end of the flow-through substrate is prepared by placing a washcoat comprising a mixture (blend) of platinum, palladium and Cu-CHA on the flow-through substrate to form a layer. Platinum and palladium are present in the layer in a combined amount from about 10 g/ft³ to about 20 g/ft³ in the ASC zone, where Pt and Pd are present in a ratio of from about 1:1 to about 1:10 by weight. The amounts of vanadium, copper and chabazite that can be used are described in Example 3.

The catalyst article is placed first in the exhaust after-treatment system before a SCRF and the system does not contain a DOC.

Comparative Example 1

In a comparative system, a DOC is placed after the ASC and before the rest of the after-treatment system.

The catalyst articles of Examples 3-12 are used in systems without a DOC. By omitting the DOC, there is reduced cost and reduced space required because the DOC is omitted. The following additional benefits can also result from the use of articles described in Examples 3-12.

The relatively high loading of precious metal helps generate the desired exotherm.

In Examples 5-8, 11 and 12, the incorporation of Pd with Pt into the ASC promotes the generation of an exotherm with less impact on the $NH_3$ oxidation compared to an article only using Pt to generate the exotherm.

By providing improved exotherm properties, the catalyst articles will also reduce hydrocarbons.

The use of one or more PGMs in the ASC will increase the formation of $NO_2$, reducing the need for a DOC.

By reducing the thickness of the top layer in the ASC zone, the exotherm generation in the bottom layer can be promoted. This can improve $NO_2$ formation.

In Examples 9-12, the use of a single layer comprising a mixture (blend) of one or more PGMs and the SCR catalyst as the ASC will further improve the exotherm performance and reduce the cost, and can improve the formation of $NO_2$.

The use of Pd in the top layer will improve the exotherm properties of the article as well and improve the formation of $NO_2$ and reduce hydrocarbon emissions.

The system described in the Examples can reduce $N_2O$ production by eliminating the use of a DOC. When a DOC is present in a conventional system, $NH_3$ can slip from a system upstream of a DOC and cause $N_2O$ formation.

Example 13—Zoned Systems

The systems described in Examples 3-10 are modified to provide zoning within the ASC where the PGM loading is higher in the outlet end of the ASC. This zoning is produced in either the layered system as described in Examples 3-6 or in the combined single layer in Examples 7-10 by placing two or more washcoats next to each other with increasing levels of one or more PGMs in the zone(s) closest to the outlet.

The systems described in Examples 3-10 can be modified to provide different top layer thicknesses in the ASC zone when a bi-layer ASC zone is used.

The composition of the ASC in the systems described in Examples 3-10 can be modified to include one or more PGMs in the top layer towards the outlet end of the end of the catalyst article.

The preceding examples are intended only as illustrations, the following claims define the scope of the invention.

I claim:

1. A catalyst article comprising a substrate comprising an inlet end and an outlet, a first zone comprising a first SCR catalyst and a second zone comprising an ammonia slip catalyst (ASC), wherein the ammonia slip catalyst comprises a second SCR catalyst and an oxidation catalyst, wherein the first zone is located on the inlet side of the substrate and the second zone is located in the outlet side of the substrate,
   wherein the ASC is a bi-layer with a bottom layer comprising an oxidation catalyst and a top, overlayer, comprising a second SCR catalyst.

2. The catalyst article of claim 1, wherein the first zone and the second zone are located on the same substrate and the first zone is located on the inlet side of the substrate and the second zone is located on the outlet side of the substrate.

3. The catalyst article of claim 1 further comprising a second substrate, wherein the first zone is located on a first substrate and the second zone is located on the second substrate and the first substrate is located upstream of the second substrate.

4. The catalyst article of claim 1, wherein the oxidation catalyst comprises a platinum group metal.

5. The catalyst article of claim 1, wherein the oxidation catalyst comprises platinum or palladium or mixtures thereof.

6. The catalyst article of claim 1, wherein the first SCR catalyst is a base metal, an oxide of a base metal, a molecular sieve, a metal exchanged molecular sieve or a mixture thereof.

7. The catalyst article of claim 1, wherein the second SCR catalyst is a Cu-SCR catalyst, an Fe-SCR catalyst, a base metal, an oxide of a base metal or a mixed oxide or a vanadium catalyst.

8. The catalyst article of claim 1, wherein the oxidation catalyst comprises platinum on a support with low ammonia storage.

9. The catalyst article of claim 1, wherein the catalyst article provides an improvement in $N_2$ yield from ammonia at a temperature from about 250° C. to about 350° C. compared to a catalyst comprising a comparable formulation in which the first SCR catalyst is present as a first coating and the platinum on a support with low ammonia storage is present in a second coating and gas comprising $NH_3$ passes through the first coating before passing through the second coating.

10. The catalyst article of claim 1, wherein the catalyst article provides at least one of: (a) an improvement in $N_2$ yield from ammonia at a temperature from about 350° C. to about 450° C., and (b) a reduction in NOx formation at a temperature from about 350° C. to about 450° C., compared to a catalyst comprising a comparable formulation in which the first SCR catalyst is present as a first coating and the supported platinum is present in a second coating and gas comprising $NH_3$ passes through the first coating before passing through the second coating.

11. The catalyst article of claim 1, wherein the catalyst article provides reduced $N_2O$ formation from $NH_3$ compared to a catalyst comprising a comparable formulation in which the first SCR catalyst is present as a first coating and the supported platinum is present in a second coating and gas comprising $NH_3$ passes through the first coating before passing through the second coating.

12. The catalyst article of claim 1, wherein the catalyst article generates an exotherm.

13. A method of controlling NOx emissions in an exhaust gas, the method comprising contacting an exhaust gas comprising NOx or $NH_3$ with a catalyst article of claim 1.

* * * * *